US012593094B2

(12) United States Patent
Rivoalen et al.

(10) Patent No.: US 12,593,094 B2
(45) Date of Patent: Mar. 31, 2026

(54) METHOD FOR MANAGING THE ACCESS TO A CONTENT AND THE READING OF A MULTIMEDIA CONTENT

(71) Applicant: ORANGE, Issy-les-Moulineaux (FR)

(72) Inventors: Mathieu Rivoalen, Chatillon (FR); Hervé Marchand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 27 days.

(21) Appl. No.: 18/514,188

(22) Filed: Nov. 20, 2023

(65) Prior Publication Data

US 2024/0171808 A1 May 23, 2024

(30) Foreign Application Priority Data

Nov. 21, 2022 (FR) ...................................... 2212059

(51) Int. Cl.
*H04N 21/431* (2011.01)
*H04N 21/482* (2011.01)
(52) U.S. Cl.
CPC ....... *H04N 21/431* (2013.01); *H04N 21/4821* (2013.01); *H04N 21/4825* (2013.01)
(58) Field of Classification Search
CPC ............. H04N 21/431; H04N 21/4821; H04N 21/4825
See application file for complete search history.

(56) References Cited

U.S. PATENT DOCUMENTS

2009/0265743 A1* 10/2009 Gao ................. H04N 21/26616
725/95
2011/0083146 A1 4/2011 Bruckman et al.
2012/0141088 A1* 6/2012 Isozu ............. H04N 21/440281
386/230

FOREIGN PATENT DOCUMENTS

FR 3054765 A1 2/2018
WO WO-0114986 A1 * 3/2001 ......... H04N 21/4381

OTHER PUBLICATIONS

French Search Report and Written Opinion dated Apr. 28, 2023 for corresponding French Application No. 2212059, filed Nov. 21, 2022.
Noh Jeonghun et al., "Stanford Peer-to-Peer Multicast (SPPM)— Overview and recent extensions", Picture Coding Symposium; Jun. 5, 2009-Aug. 5, 2009; Chicago, May 6, 2009 (May 6, 2009), XP030081861.

* cited by examiner

*Primary Examiner* — Sumaiya A Chowdhury
(74) *Attorney, Agent, or Firm* — David D. Brush; Westman, Champlin & Koehler, P.A.

(57) ABSTRACT
A method for managing the access, by a reader device, to a multimedia content. The method includes, for the same content: acquiring a set of multicast broadcast channels associated with respective broadcast times spaced out over time, requesting rendering of data representative of multicast channels obtained during the acquiring, and receiving a selection of one multicast broadcast channel from amongst the broadcast channels included in the rendering request.

8 Claims, 3 Drawing Sheets

[Fig 1]
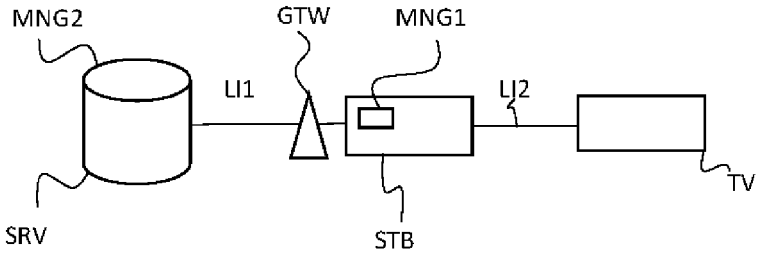
[Fig 2]
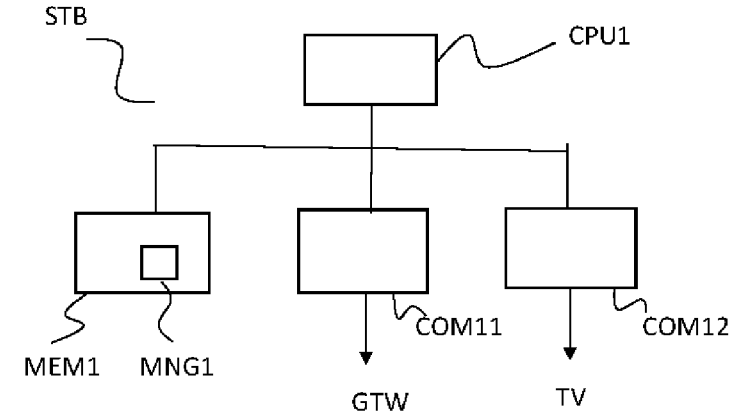
[Fig 3]
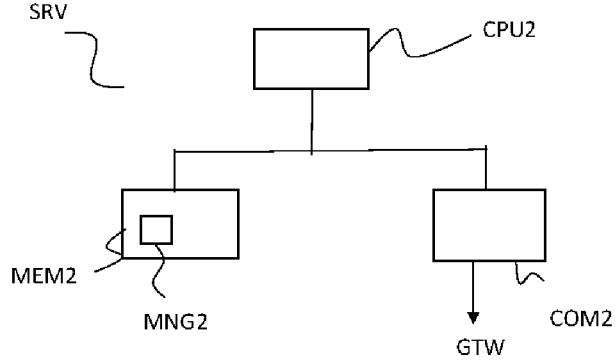

[Fig 4]
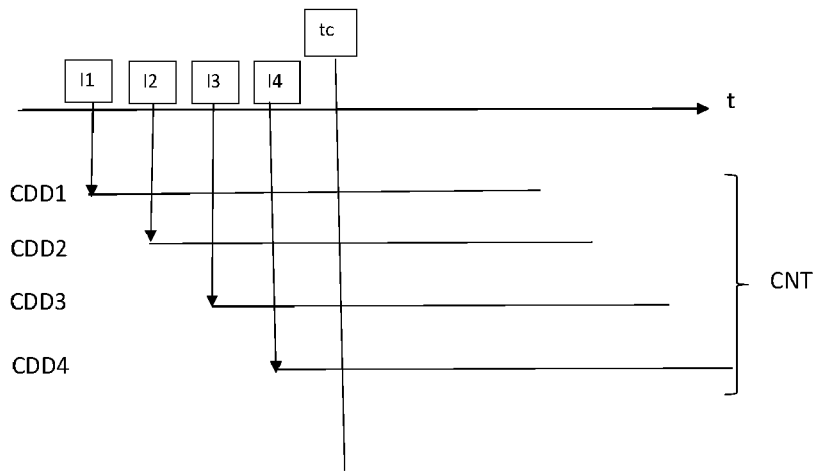
[Fig 5]
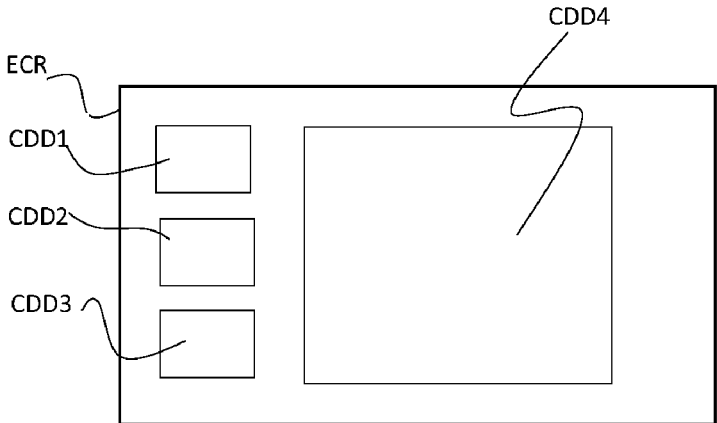

[Fig 6]
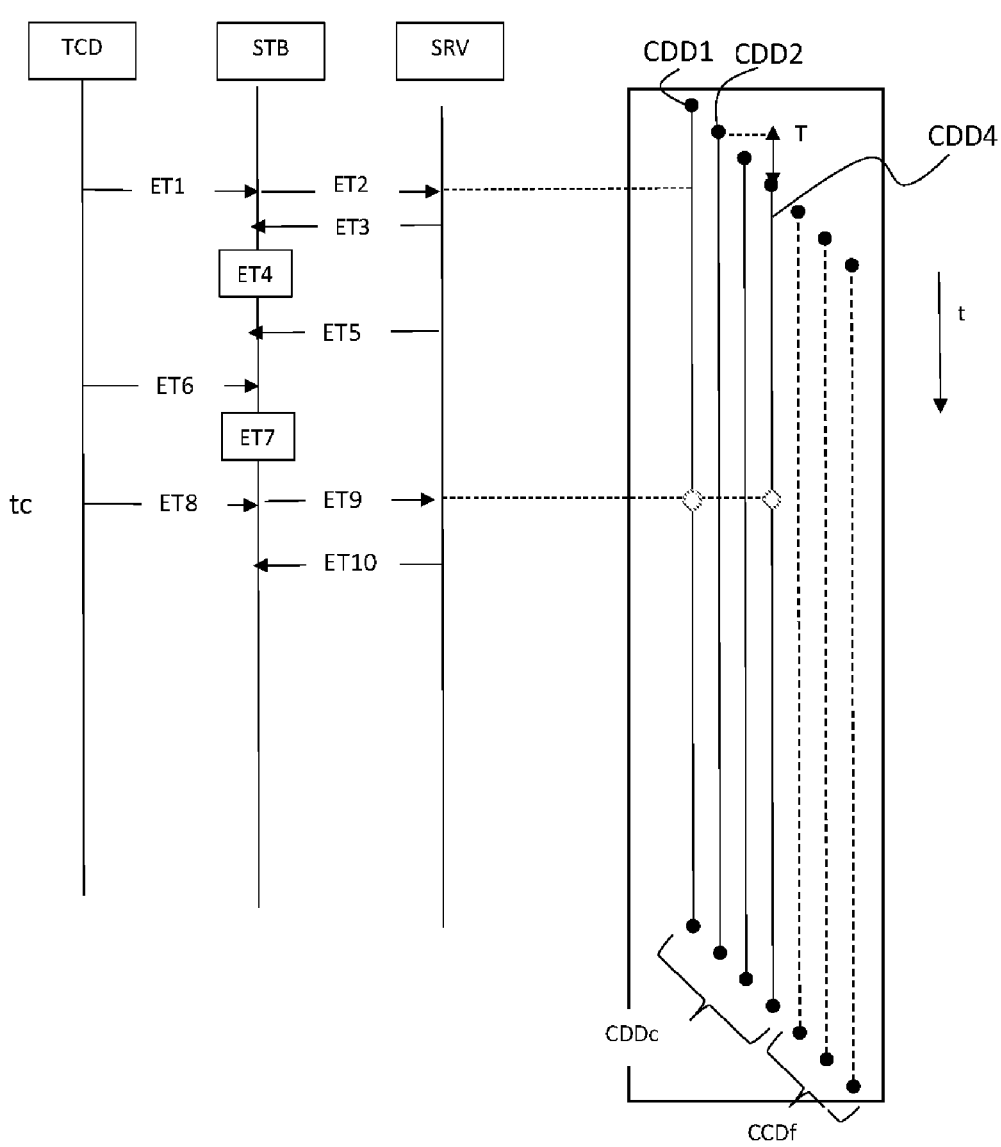

METHOD FOR MANAGING THE ACCESS TO A CONTENT AND THE READING OF A MULTIMEDIA CONTENT

CROSS-REFERENCE TO RELATED APPLICATIONS

This application is claims priority to and the benefit of French Application No. FR2212059, filed Nov. 21, 2022, the content of which is incorporated herein by reference in its entirety.

TECHNICAL FIELD

The field of the disclosure is that of digital multimedia contents, namely digital audio and/or video contents, also referred to as audiovisual contents.

The disclosure relates especially to a method for managing the reading of a multimedia content broadcast in multicast mode.

The contents in question here are contents broken down into segments associated with several respective coding rates selectable upon requests generated by a device for reading multimedia streams.

A reader device is aimed at all devices capable of receiving multimedia streams, for example a decoder, a mobile telephone, a tablet, etc.

The content targeted here is a content having a programmed broadcast time. Such a content is for example a "live" content broadcast by a television channel.

PRIOR ART

It sometimes happens that the start of a television program (film, series, etc.) is missed. A function referred to as "Start Over" or "Restart" by those skilled in the art allows the program being broadcast to be restarted from the beginning at any time. For example, if a film starts at 20:50 on a broadcast channel (a television channel) and if a user selects this television channel at 21:17, the user can launch the "start over" function in order to be able to read the content from the start.

Generally speaking, the broadcast of live content relies on a broadcast technology in multi-broadcast mode (also referred to as "multipoint" or "Multicast" by those skilled in the art). This technology allows large amounts of bandwidth to be saved in the network of an operator managing the broadcast because the content is replicated as near as possible to the reader devices. On the other hand, when a reader device requires the use of the "Restart" function, an access to the requested content triggers an automatic switching of the multicast technology to a content broadcast technology in point-to-point (unicast) mode. The consumption of bandwidth in the network of the operator therefore considerably increases owing to the point-to-point transmission between the content server and all of the reader devices having requested a use of the "start over" function; for example when the content requested is a content with a wide audience, the number of point-to-point connections may become gigantic and lead to a 'bottleneck' phenomenon of the bandwidth, which is detrimental to the performance of the network.

One or more aspects of the present disclosure provides a solution without the drawbacks of the prior art.

SUMMARY

For this purpose, according to a first functional aspect, the subject of the disclosure is a method for managing the access, by a reader device, to a multimedia content, characterized in that it comprises a step for acquiring, for the same content, a set of multicast broadcast channels associated with chronologically separate respective broadcast times, and in that it comprises a step for requesting rendering of data representative of multicast channels obtained during the acquisition step, and for receiving a selection of one multicast broadcast channel from amongst the broadcast channels included in the rendering request.

According to an exemplary aspect of the disclosure, when a multicast broadcast is provided on a broadcast channel for a multimedia content, several other multicast broadcast channels are created for this same televised content with broadcast times spread out over time, respectively. According to an exemplary aspect of the disclosure, data relating to the channels created are rendered and are individually selectable. Once the multicast broadcast channel has been selected from amongst the channels created for the same content, the reader device renders the stream coming from the selected channel.

The reading of the content may thus be carried out from a corresponding read time which depends on the selected channel in multicast mode. The use of multicast mode instead and in place of unicast mode offers an optimum rendering quality and considerably reduces the bandwidth on the network during the access to a content.

According to a first embodiment, the data rendered are only aimed at a part of said set of multicast broadcast channels. This first mode avoids rendering all the data relating to all the channels created without which the screen would be overloaded with information. Moreover, the representative data may have a non-negligible size in bytes; for example if the data are images or videos intended to be rendered in correspondence with the channels respectively concerned, only transmitting a part of the data representative of the channels reduces the size of the message to be transmitted and reduces the processing of the message both by the reader device generating the message and by the rendering device receiving the message.

According to a second embodiment, which could be alternatively or cumulatively implemented with the preceding embodiment, the data representative of multicast channels included in the rendering request depend on the desired type of browsing, the latter corresponding to switching from one multicast broadcast channel to another multicast broadcast channel. This embodiment allows only the channels relevant to the implementation of a browsing action to be displayed, a browsing action consisting in carrying out jumps between multicast broadcast channels corresponding to time skips in the content. The jumps in question allow a rewind in the content or a fast forward in the content to be carried out. The following variants are possible cases of the choice of the data representative of multicast channels depending on the type of browsing.

According to a first variant of the second embodiment, if the browsing is a time skip representative of a rewind in the content, only data relating to the channels having a time of creation later than the current time are rendered. According to a second variant of the second embodiment, which could be implemented alternatively or cumulatively with the first variant, if the browsing is a time skip representative of a fast forward in the content, only data relating to the channels having a time of creation earlier than the current time are rendered. The two preceding variants allow only data relating to channels capable of performing a rewind or a fast forward in the content to be rendered according to the variant chosen. Reducing the number of channels reduces the surface area occupied on the rendering device. The user experience can only be improved.

Finally, according to a third embodiment, which could be implemented alternatively or cumulatively with the preceding embodiments, the data include data relating to the time shift between channels with a view to a rendering of the channels in a given chronological order. This third embodiment allows the various multicast channels linked to the same content to be displayed and the order in which they have respectively started the broadcast. This information facilitates the selection of a channel when it is desired to re-read the content for example to render/review a scene of a film or an action during a sports competition, for example a goal during a football match.

According to a first hardware aspect, the disclosure relates to an entity for managing the access, by a reader device, to a multimedia content, characterized in that the entity comprises a processor configured for carrying out the following steps: a step for acquiring, for the same content, a set of multicast broadcast channels associated with respective broadcast times spaced out over time, and in that it comprises a step for requesting rendering of data representative of multicast channels obtained during the acquisition step, and for receiving a selection of one multicast broadcast channel from amongst the broadcast channels included in the rendering request.

According to a second hardware aspect, the disclosure relates to a reader device comprising a management entity such as defined hereinabove.

According to a third hardware aspect, the disclosure relates to a computer program able to be implemented on an entity such as defined hereinabove, the program comprising code instructions which, when it is executed by a processor, performs the steps of the management method defined hereinabove.

Finally, according to a fourth hardware aspect, the disclosure relates to a data medium on which at least one series of program code instructions has been stored for the execution of a management method such as defined hereinabove.

Such a storage medium may be any given entity or device capable of storing the program. For example, the medium may comprise a storage means, such as a ROM, for example a CD ROM or a microelectronic circuit ROM, or else a magnetic recording means, for example a USB stick or a hard disk.

Furthermore, such a storage medium may be a transmissible medium such as an electrical or optical signal, which may be carried via an electrical or optical cable, by radio or by other means, such that the computer program that it contains is executable remotely. The program according to an exemplary aspect of the disclosure may in particular be up/downloaded over a network, for example the Internet.

Alternatively, the storage medium may be an integrated circuit in which the program is incorporated, the circuit being designed for executing or for being used in the execution of the aforementioned display control method.

BRIEF DESCRIPTION OF THE DRAWINGS

The disclosure will be better understood upon reading the description that follows, given by way of example and presented with reference to the appended drawings in which:

FIG. 1 shows a data processing system on which one exemplary embodiment of the disclosure is illustrated.

FIG. 2 is a simplified schematic diagram of the hardware structure of the reader device;

FIG. 3 is a simplified schematic diagram of the hardware structure of the server;

FIG. 4 illustrates several broadcast channels for the same content with distinct broadcast times spread out over time.

FIG. 5 illustrates one embodiment of a graphical interface displayed on a screen, the information relating to the selectable channels being organized in the form of a selectable frame.

FIG. 6 is a schematic view of one embodiment of the method of the disclosure.

DETAILED DESCRIPTION OF ONE EXEMPLARY EMBODIMENT OF THE DISCLOSURE

FIG. 1 shows a data processing system SYS in which a content distribution network (called CDN by those skilled in the art) is implemented from which contents are transmitted to client devices or content reader devices.

In the present example, the system comprises a single reader device STB. However, aspects of the disclosure are applicable to any given number of reader devices.

The reader device is for example a digital decoder.

Here, the multimedia content is aimed at a video content corresponding for example to a television channel on which television programs are broadcast having a start time corresponding to a programmed broadcast time and an end time. The content in question is broadcast in multicast mode.

The reader device STB is connected to a rendering terminal TV such as a television.

In the present example, the reader device STB is connected to a port of the rendering device TV; the reader device STB and the rendering device TV could also form one and the same device.

In the present example, the reader device STB is situated in a local area network LAN managed by a home system gateway GTW. The context of the local network is given by way of example and could readily be transposed to an Internet network of the "best effort" type, a company network, etc.

The gateway GTW is designed to communicate via a telecommunications network LI1 such as a wide area network WAN known to those skilled in the art.

The data processing system SYS implements a content distribution network, called CDN by those skilled in the art, from which contents are transmitted to client devices or content reader devices STB.

The network CDN is composed of servers connected in a network within the wide area network; these servers cooperate in order to make multimedia contents available to users. In order to simplify the description of an exemplary aspect of the disclosure, a single content server SRV will be shown in FIG. 1 in order to represent the CDN.

The content server SRV is located, in the present example, within the wide area network WAN.

The content server SRV receives for example digital television content channels coming from a broadcast television network (not shown), and makes them available to client terminals, here the reader device STB.

The contents CNT are made available in a given format. Such a content CNT is, for example, a content downloaded in adaptive streaming mode. The standard MPEG-DASH (for "Dynamic Adaptive Streaming over HTTP") is an audiovisual broadcast standard format over Internet. This standard is based on the preparation of the content in various representations with variable quality and rate, divided up into segments of short duration (of the order of a few seconds), also called "chunks" by those skilled in the art. Each of these segments is made available individually by means of an exchange protocol between the rendering terminal and the server providing multimedia contents. The protocol mainly targeted is the HTTP protocol, but other protocols (for example FTP) may also be used. The organization of the segments and the associated parameters are published in a description file in XML format. The details of this download mode are not further discussed since they are of no relevance for the description of the disclosure.

FIG. 2 shows one architecture of a reader device STB. This device STB conventionally comprises memories MEM1 associated with a processor CPU1. The memories may be of the ROM (for "Read Only Memory") or the RAM (for "Random Access Memory") or else the Flash type.

The decoder STB may transmit a content to be rendered to the rendering device TV via a communications module COM12. This module COM12 is for example an HDMI link.

The decoder STB communicates with the gateway via an Ethernet module for a local wired communication or via a radio module of the WiFi type for a local wireless communication with the home system gateway GTW. The module in question is referenced CMO11 in FIG. 2.

The decoder STB comprises an entity for downloading in streaming mode (not shown) designed to manage the downloading of segments of the content. The decoder STB also comprises a management entity MNG1, henceforth referred to as first management entity, subject of an exemplary aspect of the disclosure, whose function will be described hereinbelow.

With reference to FIG. 3, the server SRV is also equipped with at least one processor CPU2 and memories MEM2 for performing information processing. The server is also equipped with a management entity MNG2, referred to as second entity, designed to transmit a content from the server SRV to one or more reader devices. The server SRV communicates with the gateway GTW via a network WAN. The server comprises, for the communication with the network WAN, a communications module referenced COM2 in FIG. 3.

According to an exemplary aspect of the disclosure, the first management entity MNG1 installed on the reader device STB performs the following steps:

a step for acquiring, for the same content, a set of multicast broadcast channels CDD1-CDD4 associated with respective broadcast times I1-I4 spaced out over time;

and a step for requesting rendering of data representative of multicast channels obtained during the acquisition step, and for receiving a selection of one multicast broadcast channel from amongst the multicast broadcast channels rendered.

This rendering step may be executed for example when a user wishes to access the content in question, or at another time for example during the reading of the content in order to inform of the accessible channels and hence of the accessible streams for the same content.

Following the rendering of the various selectable channels, the reader terminal STB receives a selection of a channel and requests the rendering of the multicast stream in question on the rendering device.

An exemplary aspect of the disclosure therefore offers the possibility of selecting one stream from amongst several streams and hence, owing to the time offset between multicast broadcast channels created for the same content, for example to browse within the content going from one channel to another channel and thus to perform time skips in the content for example in order to review a scene which has already been broadcast over one or more channels.

FIG. 4 illustrates various channels created spaced out over time relating to the same content CNT. A first multicast broadcast channel stream CDD1 is created at the time t1. A second multicast broadcast channel CDD2 is created at the time t2, a third broadcast channel multicast CDD3 is created at the time t3, etc. All the multicast channels created broadcast the same content CNT.

The program broadcast start times are accessible via a list comprising all of the channels.

A user can access the content, for example at a time tc; at this time tc, the user can select within the list of channels one of the selectable channels CDD1-CDD4 in order to read the content CNT.

In the following part, in conjunction with FIG. 5, it will be seen that the interface INT rendered on the screen TV allows all or part of the list of channels created to be rendered thus allowing one of the channels created to be selected.

In this FIG. 4, various channels CDD1 to CDD4 are created with a time offset. The time offset between two consecutive streams is constant in the present example but could also be variable.

It should be noted that the number of channels may vary depending on the content and/or its duration. For example, if the content is a content with a large audience and hence likely to be very much in demand, a short spacing such as two seconds may be appropriate. It will readily be understood that, for the same spacing in time, the greater the length in time of the content, the larger is the number of broadcast channels.

In other words, following the start of the broadcast of a content, at given moments in time, for example every N minutes (N=2 minutes for example), a new multicast channel is created in order to broadcast the content from the start.

At a given moment in time, several multicast channels therefore coexist with time offsets.

All the broadcast channels created may be declared in a document called live service plan.

It should be noted here that a creation of a channel may consist in an instantiation of a channel.

FIG. 5 illustrates one embodiment of the interface introduced hereinabove. In this embodiment, the televised stream corresponding to the latest live stream preceding the receipt of a command for access to the content by the reader device STB is rendered within a frame occupying a larger space than the other streams coming from other channels with respect to the surface area of the screen. The other streams coming from other channels are shown within smaller frames. The small frames may comprise an image or a video or information linked to the start time at which the multicast broadcast has begun, or any other information.

The disclosure is not of course limited to this embodiment and other configurations of the interface may be envisioned. For example, only a part of the channels created are rendered. All or part of the future channels, in other words channels not yet created at the moment of the request for access to the content CNT, may also be rendered for information.

It will be seen in the following part that the rendering of the channels which are provided for the future allows a user to delay the moment when he/she will want to view the content.

FIG. 6 illustrates schematically the steps of one embodiment. Three axes are shown and a time axis allows the order of the steps to be understood. A first axis corresponds to a remote control TCD, a second axis corresponds to the reader device STB and a third axis which corresponds to the server SRV.

During this embodiment, several broadcast channels CDD1-CDDn (n is an integer) will be created with regular spacings, for example every two minutes, similar to FIG. 4.

In the present example, the second entity MNG2 managed by the server SRV is responsible for the creation of the multicast broadcast channels for the same content. Taking one example of a football match the official broadcast of which is programmed on Saturday evening at 8 pm (I1=20: 00) on a multicast channel CDD1, the second entity will create channels for example every 2 minutes at 20:02 via a channel CDD2, at 20:03 via a channel CDD3, etc.

The method comprises several steps referenced ETk.

During a step ET1, a command SEL for selecting a content CNT is transmitted from the remote control to the reader device STB.

During a step ET2, the reader device STB receives the command and executes it; the execution of the command leads to a transmission of a request for access to the content CNT to the server SRV.

At this moment, in the present example, four channels CDDc have already been created, namely the channels CDD1-CDD4; the broadcast of the content via these channels has already begun.

It is also assumed that channels CDDf, referred to as "future channels", are provided at the creation. In FIG. 6, three future channels CDDf are illustrated in the figure with dashed lines.

It will be seen that it is not necessary to render all the channels created CDDc or future channels CDDf.

At the moment of the request for access to the content, in the present example, the last multicast broadcast channel created CDDc is the channel CDD4.

In the present example, during a step ET3, in response the server SRV transmits the content CNT from the last channel created, namely the channel CDD4, so that the rendering starts as close as possible to the start of the television program and without delay. The next channel CDD5 could also have been chosen instead and in place of the channel CDD4; this potentially leads to a wait time delay but allows a rendering of the television program from the start and hence in its entirety.

The channel chosen in the present example is therefore the channel CDD4.

The reader device STB subsequently receives the content CNT via the channel CDD4 during a step ET5 and renders it.

In the present example, during a step following the step ET5, the reader device STB receives a list of multicast broadcast channels. In the present example, this list comprises all the broadcast channels created at the time of the receipt of the access request during the step ET2. This list is subsequently updated for example as the broadcast channels are created. It will be seen hereinbelow that variants are possible with regard to this list.

The list may be transmitted from the server at various times. For example, the list may be transmitted by the server SRV at the same time as the stream coming from the channel CDD4. The list may also be transmitted prior to an access to the content or later on. For example, when the user wishes to browse within the content and carry out time skips (rewind << or fast forward >> in the content), a browsing command (for example a fast forward >> in the content) may trigger a transmission of the list of channels by the server SRV.

It is pointed out here that the rewind command is often symbolized by the symbol <<, and the fast forward by the symbol >>.

During a step ET6, a rewind command << is transmitted from the remote control TCD.

During a step ET7, the reader device STB receives the rewind command << and renders the list of broadcast channels being broadcast received from the server SRV during the step ET5, or an updated list. The rendering is for example carried out via a human machine interface INT such as shown in FIG. 5.

At this stage, the user can select a channel with his/her remote control TCD from amongst the channels created CDD1-CDD3, for example the channel CDD2. If other channels are created prior to the selection of the channel with the remote control TCD, the list is updated and transmitted to the reader device STB.

During a step ET8, a command for selecting a channel CDD2 is transmitted by the remote control TCD.

During a step ET9, the reader device STB transmits a command for selection of the channel CDD2 to the server SRV.

During a step ET10, the server SRV subsequently transmits the stream broadcast over the channel CDD2.

The reader device STB receives in return the content CNT via the second channel CDD2. The stream broadcast in multicast over this channel CDD2 having started in advance with an offset of a time T with respect to the channel CDD, it is understood that the reading of the stream via the channel CDD2 has the effect of reading the stream at a time (tc-T), tc being the current read time of the live content, the time T being the time lag between the channels CDD2 and CDD4.

Later on, the user may continue to browse and select another broadcast channel depending on whether he/she wishes to perform a rewind << in the content or a fast forward >> in the content. A rewind will be carried out by selecting a channel having a later date of creation; a fast forward will be carried out by selecting a channel having an earlier date of creation.

The embodiment described hereinabove may be subject to variants described hereinbelow.

According to one variant, the interface only comprises the streams being broadcast CDDc; the channels not yet created are not rendered. This variant reduces the quantity of information rendered on the screen.

According to another variant, as soon as a channel CDDn is created, the latter is added to the list and becomes potentially selectable over the interface INT.

According to another variant, the broadcast channels CDDf, referred to as future channels, whose respective broadcast times are to come, are rendered on the screen as a complement to the channels already created. In this configuration, a selection of such a future channel leads to a wait time delay before rendering. For example, when the user wishing to view the content is not ready, this variant allows the user to be informed of the broadcast times over these future channels.

According to one variant, the channels rendered depend on the desired type of browsing.

For example, when the browsing is a time skip representative of a rewind in the content, only channels having a time of creation later than the current time are rendered. Or, when the browsing is a time skip representative of a fast forward in the content, only channels having a time of creation earlier than the current time are rendered.

One way of representing the various broadcast channels on the interface INT has previously been seen in conjunction with FIG. 5.

According to one variant, the channels CDDn are simultaneously displayed on the screen in the form of a mosaic. Other ways of rendering the various selectable channels may of course be envisioned.

The various streams of the various channels may be rendered on the screen in the mosaic.

According to one variant, thumbnail images are rendered in conjunction with the various channels CDDn, respectively.

Instead of a rendering of the stream or of a thumbnail representative of the stream, textual, or even audio, information may be rendered. The information may include for example relevant data to assist the selection such as the time at which the rendering of the stream over the channel in question has started.

It is lastly mentioned here that the term 'module' or the term 'entity' may just as easily correspond to a software component as to a hardware component or an assembly of hardware and software components, a software component itself corresponding to one or more computer programs or sub-programs or, more generally, to any element of a program designed to implement a function or a set of functions such as described for the modules in question. In the same way, a hardware component corresponds to any element of a hardware assembly designed to implement a function or a set of functions for the module in question (integrated circuit, smartcard, memory card, etc.).

Although the present disclosure has been described with reference to one or more examples, workers skilled in the art will recognize that changes may be made in form and detail without departing from the scope of the disclosure and/or the appended claims.

The invention claimed is:

1. A management method for managing access, by a reader device, to a multimedia content, wherein the method is implemented by a management entity and comprises, for the same multimedia content:
  acquiring a set of multicast broadcast channels associated with respective broadcast times spaced out over time,
  requesting rendering of data representative of multicast channels obtained during the acquiring, and
  receiving a selection of one multicast broadcast channel from amongst the broadcast channels included in the rendering request,
  wherein the data representative of the multicast channels includes thumbnail images.

2. The management method according to claim 1, wherein the data rendered are only aimed at a part of said set of multicast broadcast channels.

3. The management method according to claim 1, wherein the data representative of multicast channels included in the rendering request depend on a desired type of browsing, wherein the browsing corresponds to switching from one multicast broadcast channel to another multicast broadcast channel.

4. The management method according to claim 3, wherein, in response to the browsing being a time skip representative of a rewinding of the multimedia content, only data relating to channels having a time of creation later than a current time are rendered.

5. The management method according to claim 3, wherein, in response to the browsing being a time skip representative of a fast forward of the multimedia content, only the data relating to channels having a time of creation earlier than a current time are rendered.

6. The management method according to claim 1, wherein the data include data relating to a time offset between the multicast broadcast channels with a view to a rendering of the multicast broadcast channels in a given chronological order.

7. An entity for managing access, by a reader device, to a multimedia content, wherein the entity comprises:
  at least one processor configured to carry out steps including, for the same multimedia content:
  acquiring a set of multicast broadcast channels associated with respective broadcast times spaced out over time;
  requesting rendering of data representative of multicast channels obtained during the acquiring, and
  receiving a selection of one multicast broadcast channel from amongst the multicast broadcast channels included in the rendering request,
  wherein the data representative of the multicast channels includes thumbnail images.

8. At least one non-transitory computer readable medium on which at least one series of program code instructions is stored for implementing a method for managing access, by a reader device, to a multimedia content, when the instructions are executed by at least one processor of a management entity, wherein the method comprises, for the same multimedia content:
  acquiring a set of multicast broadcast channels associated with respective broadcast times spaced out over time,
  requesting rendering of data representative of multicast channels obtained during the acquiring, and
  receiving a selection of one multicast broadcast channel from amongst the broadcast channels included in the rendering request,
  wherein the data representative of the multicast channels includes thumbnail images.

* * * * *